US010579068B2

(12) United States Patent
Madsen et al.

(10) Patent No.: US 10,579,068 B2
(45) Date of Patent: Mar. 3, 2020

(54) USING OPTICAL SENSORS TO RESOLVE VEHICLE HEADING ISSUES

(71) Applicant: AGJUNCTION LLC, Hiawatha, KS (US)

(72) Inventors: Tommy Ertbolle Madsen, Fremont, CA (US); Glen Sapilewski, Emerald Hills, CA (US); Anant Sakharkar, San Jose, CA (US); Jean-Marie Eichner, Sunnyvale, CA (US); Steven J. Dumble, Brisbane (AU)

(73) Assignee: AGJUNCTION LLC, Scottsdale, AZ (US)

(*) Notice: Subject to any disclaimer, the term of this patent is extended or adjusted under 35 U.S.C. 154(b) by 25 days.

(21) Appl. No.: 15/722,916

(22) Filed: Oct. 2, 2017

(65) Prior Publication Data
US 2018/0095476 A1    Apr. 5, 2018

Related U.S. Application Data

(60) Provisional application No. 62/403,364, filed on Oct. 3, 2016.

(51) Int. Cl.
*G05D 1/02* (2006.01)
*G01S 19/47* (2010.01)
(Continued)

(52) U.S. Cl.
CPC ......... *G05D 1/0278* (2013.01); *A01B 69/001* (2013.01); *G01C 21/165* (2013.01);
(Continued)

(58) Field of Classification Search
None
See application file for complete search history.

(56) References Cited

U.S. PATENT DOCUMENTS

| 5,194,851 A | 3/1993 | Kraning et al. |
| 5,390,125 A | 2/1995 | Sennott et al. |
| (Continued) | | |

FOREIGN PATENT DOCUMENTS

| WO | 1995/015499 A1 | 6/1995 |
| WO | 2015/085483 A1 | 6/2015 |

OTHER PUBLICATIONS

Noh, Kwang-Mo, "Self-tuning Controller for Farm Tractor Guidance"; Digital Repository @ Iowa State University, Retrospective Theses and Dissertations. Paper 9874; (1990); 192 pages.

(Continued)

*Primary Examiner* — Abdhesh K Jha
(74) *Attorney, Agent, or Firm* — Schwabe Williamson & Wyatt

(57) ABSTRACT

A control system fuses different sensor data together to determine an orientation of a vehicle. The control system receives visual heading data for the vehicle from a camera system, global navigation satellite system (GNSS) heading data from a GNSS system, and inertial measurement unit (IMU) heading data from an IMU. The control system may assign weights to the visual, GNSS, and IMU heading data based on operating conditions of the vehicle that can vary accuracy associated with the different visual, GNSS, and IMU data. The control system then uses the weighted visual, GNSS, and IMU data to determine a more accurate vehicle heading.

17 Claims, 15 Drawing Sheets

(51) Int. Cl.
*G01S 19/49* (2010.01)
*G01S 19/52* (2010.01)
*G01C 21/16* (2006.01)
*A01B 79/00* (2006.01)
*A01B 69/00* (2006.01)
*G01S 19/39* (2010.01)
*G01S 19/48* (2010.01)
*A01B 69/04* (2006.01)

(52) U.S. Cl.
CPC .............. *G01S 19/39* (2013.01); *G01S 19/47* (2013.01); *G01S 19/48* (2013.01); *G01S 19/49* (2013.01); *G01S 19/52* (2013.01); *G05D 1/027* (2013.01); *G05D 1/0246* (2013.01); *A01B 69/008* (2013.01); *A01B 79/005* (2013.01); *G05D 2201/0201* (2013.01)

(56) References Cited

U.S. PATENT DOCUMENTS

| | | | |
|---|---|---|---|
| 5,663,879 A | 9/1997 | Trovato | |
| 5,923,270 A | 7/1999 | Sampo | |
| 5,928,309 A | 7/1999 | Korver et al. | |
| 6,052,647 A | 4/2000 | Parkinson et al. | |
| 6,070,673 A | 6/2000 | Wendte | |
| 6,212,453 B1 | 4/2001 | Kawagoe | |
| 6,373,432 B1 | 4/2002 | Rabinowitz et al. | |
| 6,377,889 B1 | 4/2002 | Soest | |
| 6,445,983 B1 | 9/2002 | Dickson et al. | |
| 6,539,303 B2 | 3/2003 | McClure et al. | |
| 6,711,501 B2 | 3/2004 | McClure et al. | |
| 6,789,014 B1 | 9/2004 | Rekow et al. | |
| 6,819,780 B2 | 11/2004 | Benson | |
| 6,865,465 B2 | 3/2005 | McClure | |
| 7,142,956 B2 | 11/2006 | Heiniger | |
| 7,162,348 B2 | 1/2007 | McClure et al. | |
| 7,242,791 B2* | 7/2007 | Han | G05D 1/0278 382/104 |
| 7,277,792 B2 | 10/2007 | Overschie | |
| 7,373,231 B2 | 5/2008 | McClure et al. | |
| 7,400,956 B1 | 7/2008 | Feller et al. | |
| 7,437,230 B2 | 10/2008 | McClure | |
| 7,460,942 B2 | 12/2008 | Mailer | |
| RE41,358 E | 5/2010 | Heiniger et al. | |
| 7,835,832 B2 | 11/2010 | Macdonald et al. | |
| 7,885,745 B2 | 2/2011 | McClure et al. | |
| 8,018,376 B2 | 9/2011 | McClure et al. | |
| 7,689,354 B2 | 3/2012 | Heiniger et al. | |
| 8,190,337 B2 | 5/2012 | McClure | |
| 8,214,111 B2 | 7/2012 | Heiniger et al. | |
| 8,311,696 B2 | 11/2012 | Reeve | |
| 8,386,129 B2 | 2/2013 | Collins et al. | |
| 8,401,704 B2 | 3/2013 | Pollock et al. | |
| 8,489,291 B2 | 7/2013 | Dearborn et al. | |
| 8,521,372 B2 | 8/2013 | Hunt et al. | |
| 8,548,649 B2 | 10/2013 | Guyette et al. | |
| 8,583,315 B2 | 11/2013 | Whitehead et al. | |
| 8,583,326 B2 | 11/2013 | Collins et al. | |
| 8,589,013 B2 | 11/2013 | Pieper et al. | |
| 8,594,879 B2 | 11/2013 | Roberge et al. | |
| 8,634,993 B2 | 1/2014 | McClure et al. | |
| 8,639,416 B2 | 1/2014 | Jones et al. | |
| 8,649,930 B2 | 2/2014 | Reeve et al. | |
| 8,676,620 B2 | 3/2014 | Hunt et al. | |
| 8,718,874 B2 | 5/2014 | McClure et al. | |
| 8,768,558 B2 | 7/2014 | Reeve et al. | |
| 8,781,685 B2 | 7/2014 | McClure | |
| 8,803,735 B2 | 8/2014 | McClure | |
| 8,897,973 B2 | 11/2014 | Hunt et al. | |
| 8,924,152 B2 | 12/2014 | Hunt et al. | |
| 9,002,565 B2 | 4/2015 | Jones et al. | |
| 9,002,566 B2 | 4/2015 | McClure et al. | |
| 9,141,111 B2 | 9/2015 | Webber et al. | |
| 9,162,703 B2 | 10/2015 | Miller et al. | |
| 9,173,337 B2 | 11/2015 | Guyette et al. | |
| 9,223,314 B2 | 12/2015 | McClure et al. | |
| 9,251,587 B2* | 2/2016 | Friend | G06T 7/73 |
| 9,255,992 B2 | 2/2016 | McClure | |
| 9,389,615 B2 | 7/2016 | Webber et al. | |
| 9,816,818 B2* | 11/2017 | Czompo | G01C 21/165 |
| 2002/0072850 A1 | 6/2002 | McClure et al. | |
| 2004/0186644 A1 | 9/2004 | McClure et al. | |
| 2006/0149417 A1 | 7/2006 | Shufeng | |
| 2006/0167600 A1 | 7/2006 | Nelson, Jr. et al. | |
| 2010/0274452 A1 | 10/2010 | Ringwald et al. | |
| 2014/0266877 A1 | 9/2014 | McClure | |
| 2014/0277676 A1 | 9/2014 | Gattis | |
| 2015/0175194 A1 | 6/2015 | Gattis | |
| 2016/0039454 A1 | 2/2016 | Mortimer | |
| 2016/0154108 A1 | 6/2016 | McClure et al. | |
| 2016/0205864 A1 | 7/2016 | Gattis et al. | |
| 2016/0214643 A1 | 7/2016 | Joughin et al. | |
| 2016/0252909 A1 | 9/2016 | Webber et al. | |
| 2016/0334804 A1 | 11/2016 | Webber et al. | |

OTHER PUBLICATIONS

Van Zuydam,. R.P., Centimeter-Precision Guidance of Agricultural Implements in the Open Field by Means of Real Tim Kinematic DGPS, ASA-CSSA-SSSA, pp. 1023-1034 (1999).
International Search Report and Written Opinion for PCT/US2017/054786 dated Feb. 13, 2018; 22 pages.

* cited by examiner

USING OPTICAL SENSORS TO RESOLVE VEHICLE HEADING ISSUES

The present application claims priority to U.S. Provisional Patent Application Ser. No. 62/403,364 filed on Oct. 3, 2016, entitled: USING OPTICAL SENSORS FOR RESOLVING HEADING ISSUES which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to using optical sensors to resolve vehicle heading issues.

BACKGROUND

An automatic steering system may steer a vehicle along a desired path. The steering system may use gyroscopes (gyros), accelerometers and a global navigation satellite system (a) to determine the location and heading of the vehicle. While steering along the desired path, the vehicle may need to stop. While the vehicle is stopped, the heading estimate will drift due to drift in the gyros.

When the vehicle starts moving again, the automatic steering system will have poor steering performance until the heading and roll estimations are corrected. If the heading is offset, the controller will try to correct this and if the roll is offset then the projection from the antenna position to the ground will be offset. These offsets will slowly be corrected for example by an extended Kalman filter. However, until the offsets are corrected the vehicle will not steer as precisely and have a wiggling behavior. In very low speed operations the estimation of heading is also challenged due to noisy and/or delayed heading information from a global navigation satellite system (GNSS).

A typical agricultural GNSS steering control system uses GNSS positioning and an inertial measurement unit (IMU) for heading information or uses a dual antenna to calculate heading based on the position of the two antennas. Due to crabbing, such as on a slope, the vehicle heading is not always aligned with the direction of the course over ground. GNSS also requires a good line of sight to satellites. Trees, buildings, windmills etc. can cause the GPS position to degrade or not be available. This is important for farmers that need precise vehicle control systems. Products on the market try to solve this problem by wheel odometry, inertial navigation systems (INS) and getting the best out of the available GNSS even though it has degraded, such as from real-time kinematic (RTK) fix to RTK float, etc.

Dual antenna systems may measure the heading and roll as long as there is high precision GNSS available independent of velocity. The extra antenna hardware however makes the system more expensive than single antenna systems. The precision of the heading is also limited by the length of the baseline between the two or more antennas and the precision of the GNSS signal. This can be a problem for certain vehicles, such as narrow vineyard tractors.

Single antenna systems rely on gyros and accelerometers to measure the roll and yaw of the vehicle. The yaw is used together with the GNSS course over ground to get a good a heading of the vehicle for control of the vehicle heading. Since the course over ground is not the same as the heading of the vehicle due to crabbing, a single GNSS system will not be able to directly measure the crabbing like a dual antenna GNSS system.

The roll and heading are also used for projecting the GNSS antenna position readings to the point on the vehicle to be controlled. Typically, the vehicle operator is concerned about the accuracy on the ground. The gyros and accelerometers drift over time and are especially affected by temperature, shocks and vibration, and depending on the technology and quality, also have a bias instability that is difficult to calibrate. These biases are compensated by the GNSS course over ground information based on the Doppler effect and/or low-pass filtered delta values between the last n position measurements from GNSS. Both course over ground sources from GNSS are poor at low speed and not available at a standstill.

As mentioned above, gyroscopes are used for navigation, guidance, and stabilization and/or pointing of many manned and unmanned systems designed for commercial, industrial, and military applications. From game controllers to smartphones, and from remote stabilized weapons to driverless vehicles, gyros and inertial measurement units (IMUs) perform a number of vital navigation, guidance, and positioning functions within these systems.

With the tremendous variety of applications comes an equally wide array of performance grades in gyros and IMUs. Consumer grade gyros such as those used in video game controllers, smartphones, tablets, and automobile airbag systems exist on the low-end of both performance and cost. More demanding applications such as weapons systems, driverless vehicles, and navigation in GPS/GNSS-denied environments require a much higher grade of performance. The performance capabilities and accuracy requirements determine which technology is integrated into a specific system.

Micro-electro-mechanical systems (MEMS) gyros offer smaller size and weight and less power consumption than other gyroscopes. MEMS are capable of withstanding high non-operating shock levels, and in general offer a lower cost than other gyro technologies. Some weaknesses of MEMS gyros and inertial systems lie in critical performance parameters such as higher angle random walk/noise, which is an extremely important performance criterion in stabilization and positioning systems. In addition, MEMS gyros have higher bias instability, which results in a degraded navigation or stabilization/pointing solution. Thermal sensitivity of MEMS gyros and inertial systems also impact their bias and scale factor performance. These attributes are important to both stabilization and navigation applications.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1:
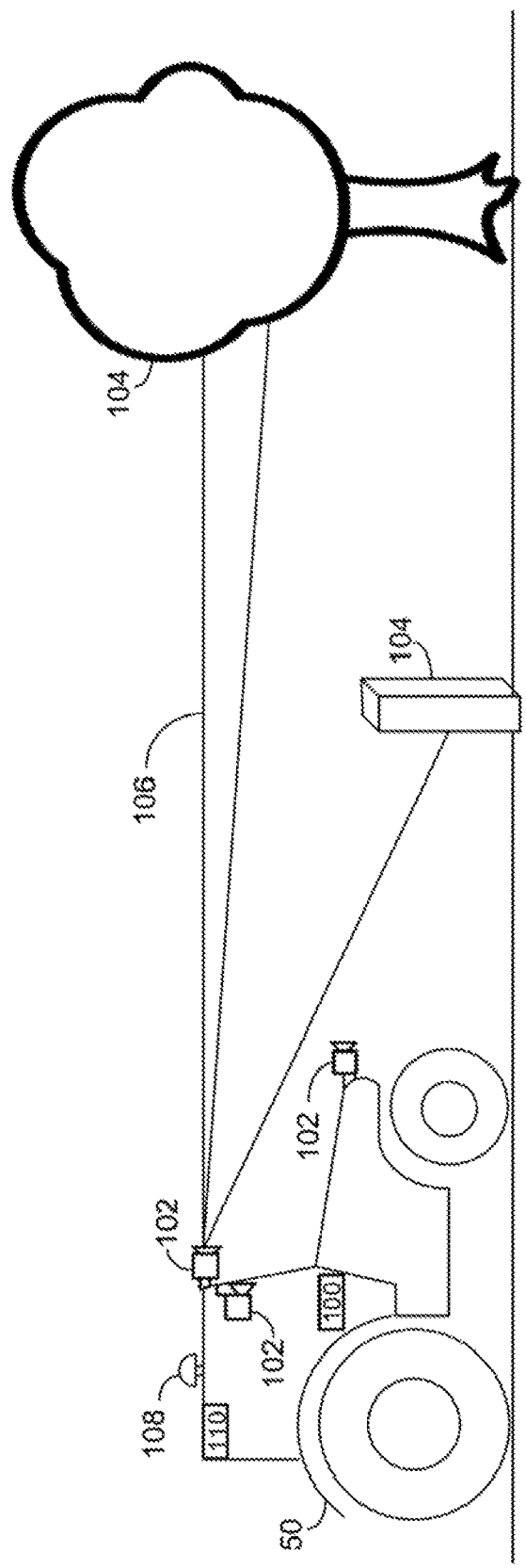
FIG. 1 is a side view of a vehicle that includes visual, GNSS, and IMU sensors.
Figure 2:
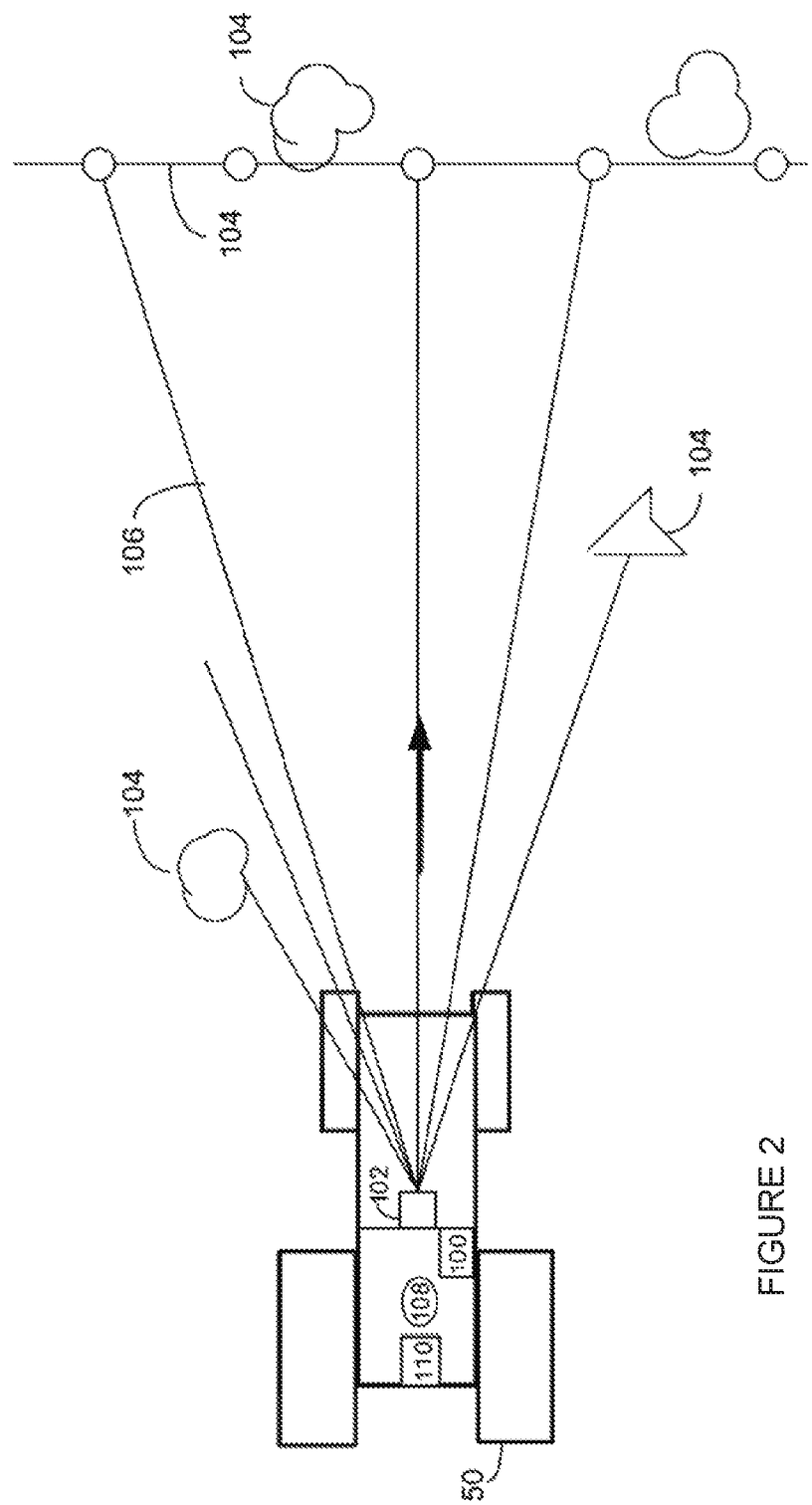
FIG. 2 is a top view of the vehicle that includes visual, GNSS, and IMU sensors.

FIG. 1 is a side view and FIG. 2 is a top view of a vehicle 50. Vehicle 50 includes a steering control system 100 that solves the problem of poor heading after a standstill start/stop, low speed and/or poor GNSS. Steering control system 100 includes a camera system that uses one or more cameras 102 to solve the problem of losing GNSS vehicle heading information during a standstill. Cameras 102 identify features 104 in a field of view 106 and continuously tracks features 104 to maintain a heading of vehicle 50 without drifting.

The explanation below may refer to GNSS and global positioning systems (GPS) interchangeably and both refer to any locating system, such as a satellite or cellular positioning system, that provides a latitude and longitude and/or a position relative to true north.

In one example, camera 102 is mounted in the front top center of the cabin of vehicle 50. Camera 102 is looking forward and has a relatively wide field of view to view features 104 close to vehicle 50 and on the horizon. In other examples, cameras 102 are located inside of the vehicle cabin and/or on a front end of vehicle 50. Of course, cameras 102 may be located in any other location of vehicle 50.

Cameras 106 do not necessarily have to look forward. Cameras 106 also may look to the side or backwards of vehicle 50. Cameras 106 could also operate as a surround view or 360 degree view and could also include an omnidirectional camera that takes a 360 degree view image.

Control system 100 may operate algorithms that calculate the pose and trajectory of cameras 106 by chronologically analyzing images in scenes or frames. These algorithms process the captured images in chronological order and track movements of the images from one frame to a next frame. Based on the tracked movement of the images, or sparse features in the images, the change in both position and orientation of camera 102 can be determined from image to image. The image movements tracked by camera 102 are used by a control algorithm in control system 100 in combination with GNSS positions from GNSS 108 and IMU turn rates and accelerations from IMU 110 for determining a heading and position of vehicle 50 that are then used for steering vehicle 50.

One example algorithm used for calculating the pose and trajectory of a camera is described in U.S. Pat. No. 8,155,870 which is incorporated by reference in its entirety. Other algorithms may only output orientation and not pose.

A sensor may include a camera 102 in combination with a three-dimensional (3D) sensor so tracked features 104 are also localized in 3D by a direct measurement. Control system 100 can also detect vehicle orientation and pose based on a single camera 102 providing monocular visual odometry that uses special initialization based on assumptions about the scene to solve scale problems.

Monocular camera measurements of features 104 are relative. An absolute scale value can be obtained by control system 100 making certain assumptions about the scene, such as a planar scene, to recover the scale or alternatively use known points in 3D for recovering scale. The 3D sensors may include integrated stereo cameras, radar, LIDAR, or any other 3D sensor. Control system 100 also may calculate the orientation and pose of vehicle 50 based on a 3D sensor alone without an additional camera 102. However, for agricultural fields a combination of camera 102 and a 3D sensor may provide more accurate vehicle orientation and pose measurements.

Control system 100 may also use visual odometry to create a map of the area, often referred to as simultaneous localization and mapping (SLAM). Optical sensors, such as camera 102 can localize when placed in the map at a later time. This map may be geographically located with GNSS when available from GNSS 108. Visual features 104 may be stored in a map based on GNSS. In one example, the map is stored online for easy updating by the different vehicles working in the field.

Visual odometry may drift as a function of primarily distance traveled. If a location in the map is revisited, control system 100 may use a loop closure operation to optimize the map and reduce drift. Control system 100 also may reduce drift by using GNSS readings when available to give absolute inputs for the map creation process.

The created map may include a pointcloud map with 3D points presenting the 3D structure of the environment. This is a popular method for laser based systems. For camera based systems, control system 100 may augment the map position information with image information, such as feature descriptions, that allow a more robust tracking from image to image and also provide better re-localization in the map.

Thus, control system 100 may generate the vehicle pose from either a visual odometry solution and/or a SLAM solution. As mentioned above, visual odometry and SLAM are known to those skilled in the art and are therefore calculating vehicle orientation and pose based on odometry or SLAM are not described in further detail.

Fusion of Vision with IMU and GNSS

Figure 3:
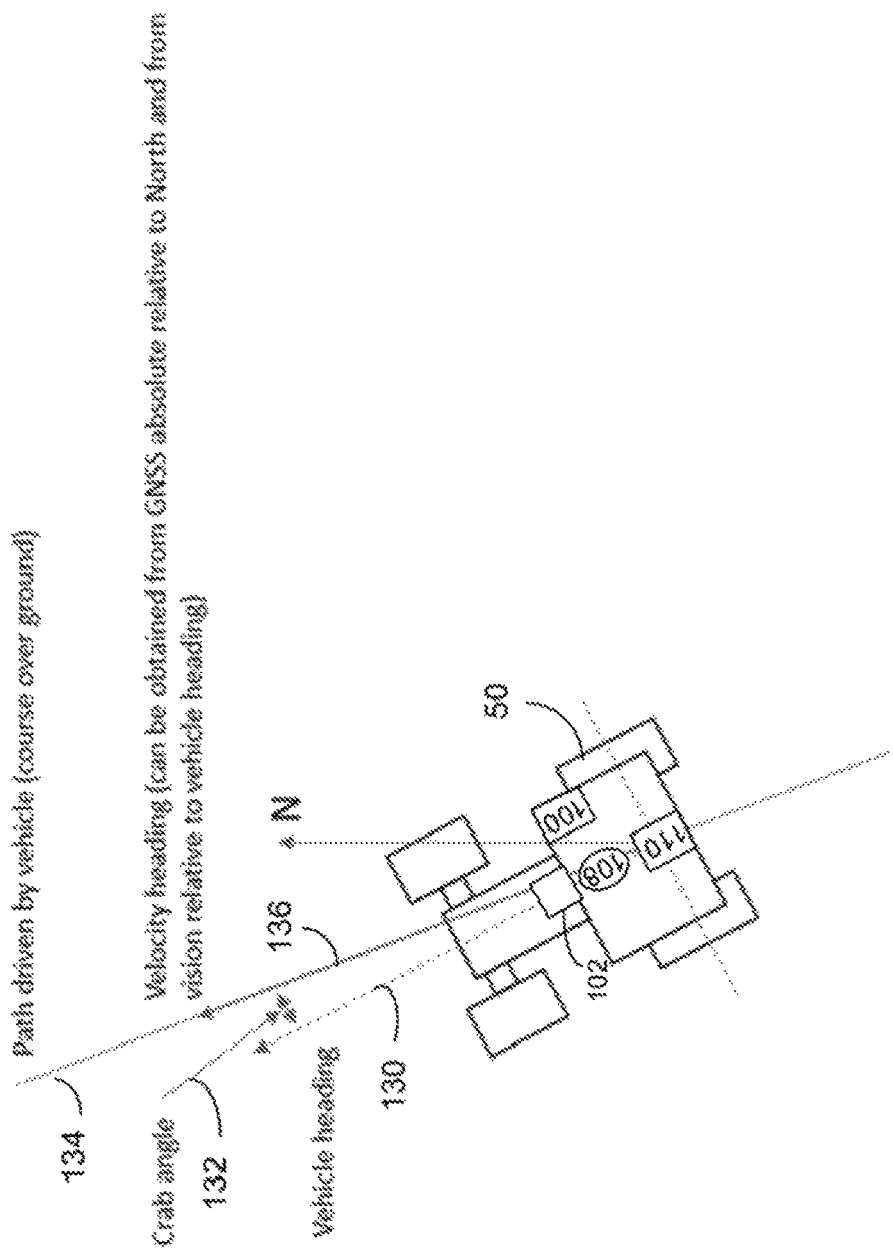
FIG. 3 shows different vehicle headings.

FIG. 3 shows reference directions for a moving vehicle. Vehicle 50 may have a heading 130. However, do to physical circumstances, such as the slope of a hill, vehicle 50 may travel along a different path referred to as course over ground 134. The angle between vehicle heading 130 and course over ground heading is referred to as the crab angle 132. Course over ground 134 is also referred to as the velocity heading 136.

Vision data from camera 102 may provide a relative position, relative orientation, relative course over ground, and speed in a vehicle coordinate frame. Known vision algorithms also may deliver confidence values associated with the vision based position, orientation, course over ground, and speed estimations. The vision data from camera 102 may drift primarily based on a distance traveled by vehicle 50.

The GNSS 108 provides GNSS data that may provide an absolute position, speed and course over ground 134 in a north-east coordinate frame. The speed and course over ground provided by GNSS 108 is typically noisy at low vehicle speeds. IMU 110 provides pitch, roll and yaw rates and accelerations. The integration of turn rates measured by IMU 110 typically drift over time.

Figure 4:
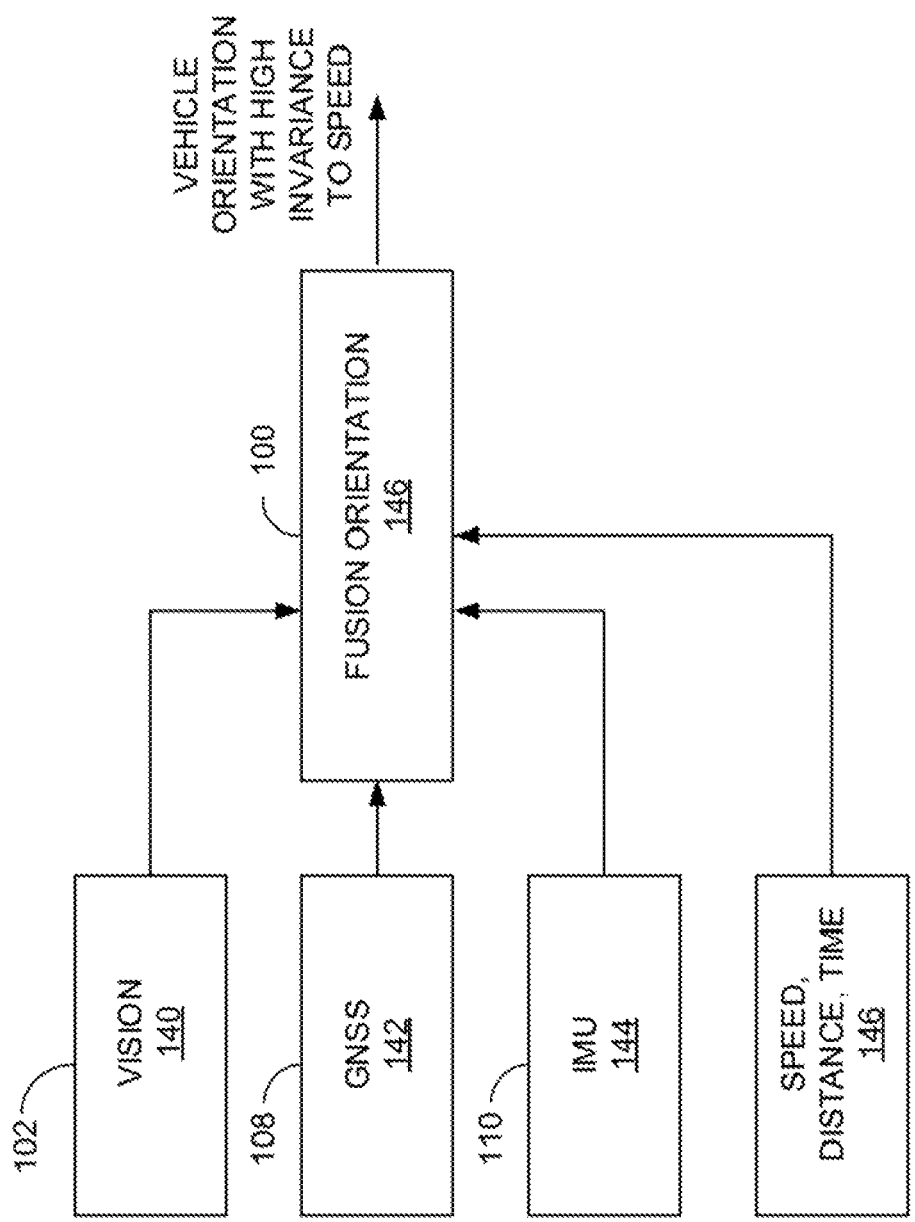
FIG. 4 shows an example fusion orientation system.

FIG. 4 is a block diagram explaining how vision data 140 from optical camera 102 is fused with GNSS data 142 from GNSS 108 and IMU data 144 from IMU 110. Control system 100 also may operational data 146 associated with vehicle 50. For example, operational data 146 may include the vehicle speed from a speedometer or calculated from GNSS 142 or camera system 102. Operational data 146 also may include a distance of vehicle travel and a time of vehicle travel.

Control system 100 operates a fusion orientation algorithm 146 that uses vision data 140, GNSS data 142, and IMU data 144 to more accurately calculate the heading and/or location of vehicle 50 after a standstill start/stop, low speed and/or poor GNSS. The description below may refer to heading and orientation interchangeably. Any reference to calculating vehicle heading below also may include calculating the vehicle position.

Figure 5:
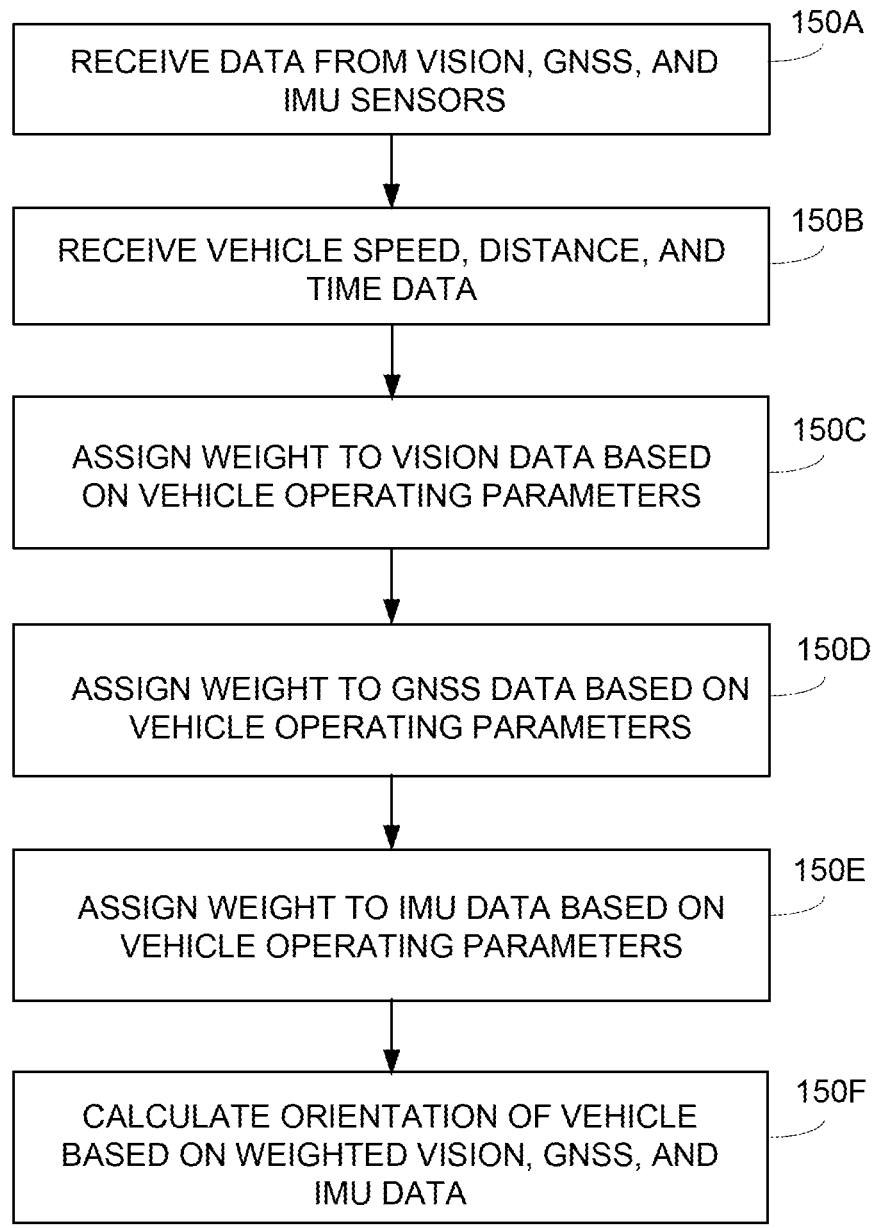
FIG. 5 shows an example process used by the fusion orientation system of FIG. 4.

FIG. 5 shows in more detail the fusion operations performed by the steering control system. Referring to FIGS. 4 and 5, in operation 150A, control system 100 may receive vision data 140 from camera 106, GNSS data 142 from GNSS 108, and IMU data 144 from IMU 110. In operation 150B, control system 100 receives speed data 146 from a vehicle speedometer or from any of sensors 102, 108, and/or 110.

Control system 100 assigns weights to vision data 140, GNSS data 142, and IMU data 144 in operations 150C, 150D, and 150E, respectively, based on vehicle operating parameters. For example, control system 100 in operation 150C may assign vision data 140 a 100% weighting when vehicle 50 is at a standstill and assign vision data 140 a higher weight at low vehicle speeds.

Control system 100 in operation 150C may further weight vision data 140 based on a confidence factor coming from a vision tracking algorithm applied to vision data 140. In other words, control system 100 may weight vision data 140 based on a reliability factor determined by vision tracking algorithms. As explained above, vision tracking algorithms that calculate vision tracking reliability are known to those skilled in the art and is therefore not explained in further detail.

In operation 150D, control system 100 may assign a higher weight to GNSS heading, speed, and course over ground data 142 when vehicle 50 travels at higher speeds. Control system 100 in operation 150 may assign lower weightings to GNSS data 142 at slower vehicle speeds and assign a zero weighting when the vehicle is stopped.

The different sensor data especially from vision and GNSS might already come with a noise characteristic in form of e.g. a covariance matrix. Ideally each sensor would already provide a noise characteristic that included the speed dependency. In this ideal case the Kalman filter could just fuse directly without any further weighting scheme. This kind of information is however often not provided to the user of a GNSS system.

In operation 150E, control system 100 may assign a higher weight to IMU data 144 when vehicle 50 is traveling as higher speeds. This may account for the less noise and drift that GNSS and IMU data may have at higher vehicle speeds and shorter time periods, respectively.

In operation 150F, control system 100 fuses together the weighted data from sensors 102, 108, and 144 to provide an improved estimate of the vehicle orientation (heading). Fusion orientation 146 in FIG. 4 weights and blends together data from camera sensor 102, GNSS sensor 108, and IMU sensor 110 to mitigate the problems with each individual sensor source. For example, fusion operation 146 mitigates the increased noise and uncertainty in single antenna GPS velocity heading measurements at reduced vehicle speeds and/or mitigates the increased drift and uncertainty in IMU yaw angle estimates associated with integrating inertial rate measurements with time.

Figure 6:
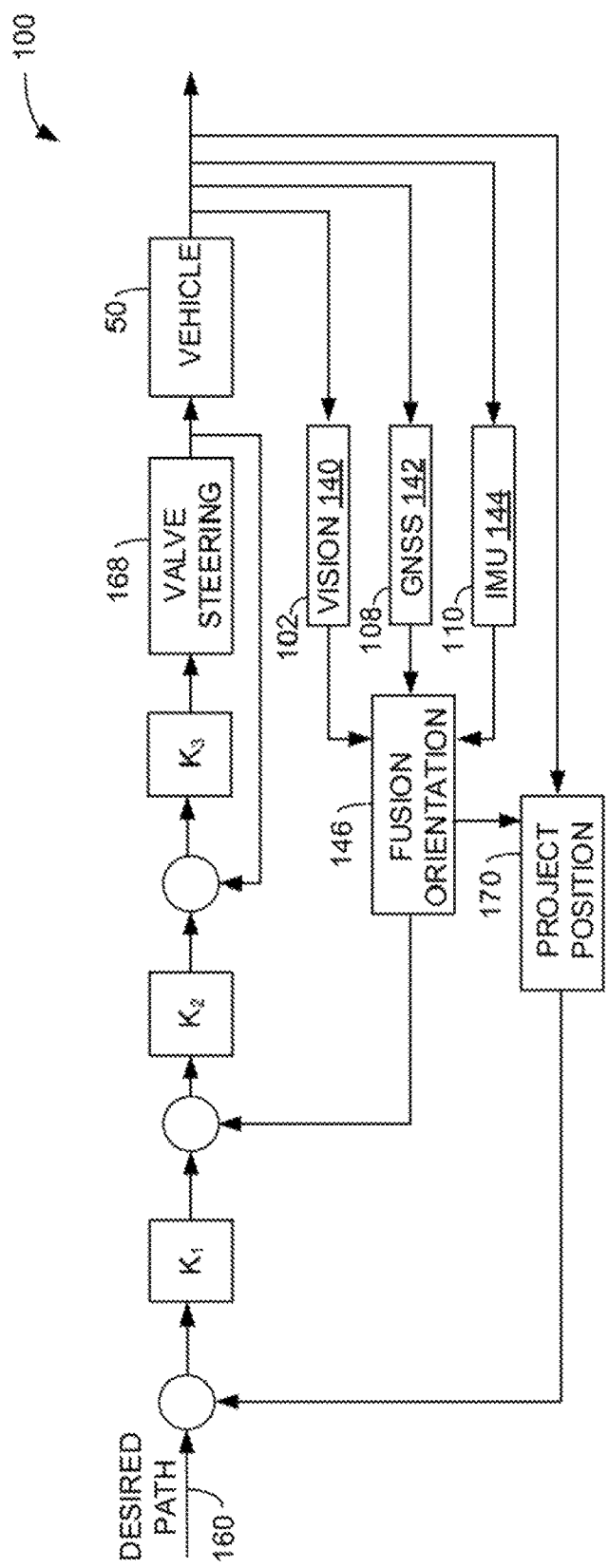
FIG. 6 shows an example steering control system that uses the fusion orientation system of FIG. 4.

FIG. 6 shows one example control system used for steering a vehicle based on the fused sensor data described above. An operator may enter a desired path 160 into control system 100. Control system 100 may include controllers $K_1$, $K_2$, and $K_3$ for controlling different characteristics of vehicle 50, sensors 140-144, and valve steering controller 168, respectively. For example, controller $K_1$ may control a heading control loop, controller $K_2$ may control a heading control loop, and controller $K_3$ may control a curvature control loop. Feedback control systems that include gain control coefficients $K_1$, $K_2$, and $K_3$ are known to those skilled in the art and is therefore not described in further detail.

Desired path 160 is fed through model controllers $K_1$, $K_2$, and $K_3$ and then into a hydraulic valve steering system 168 for that steers vehicle 50. Desired vehicle path 160 is compared with a projected position 170 of vehicle 50. The difference is fed back into controller $K_1$.

Vision data 140, GNSS data 142, and IMU data 144 from sensors 102, 142, and 144 is fused together as described above and further below by fusion operation 146 and compared with the output from controller $K_1$. The difference of the comparison is feed into controller $K_2$. The output from valve steering system 168 is fed back and compared with the output of controller $K_2$. The output of controller $K_3$ are then fed back into valve steering 168 for steering vehicle 50.

The fused heading data output from fusion operation 146 allows control system 100 to project more accurate positions 170 of vehicle 50 and more accurately steer vehicle 50. The scheme used by fusion operation 146 can be accomplished with a number of different algorithms or combinations of algorithms, such as, but not limited to, Kalman filtering and complementary filtering.

Figure 7:
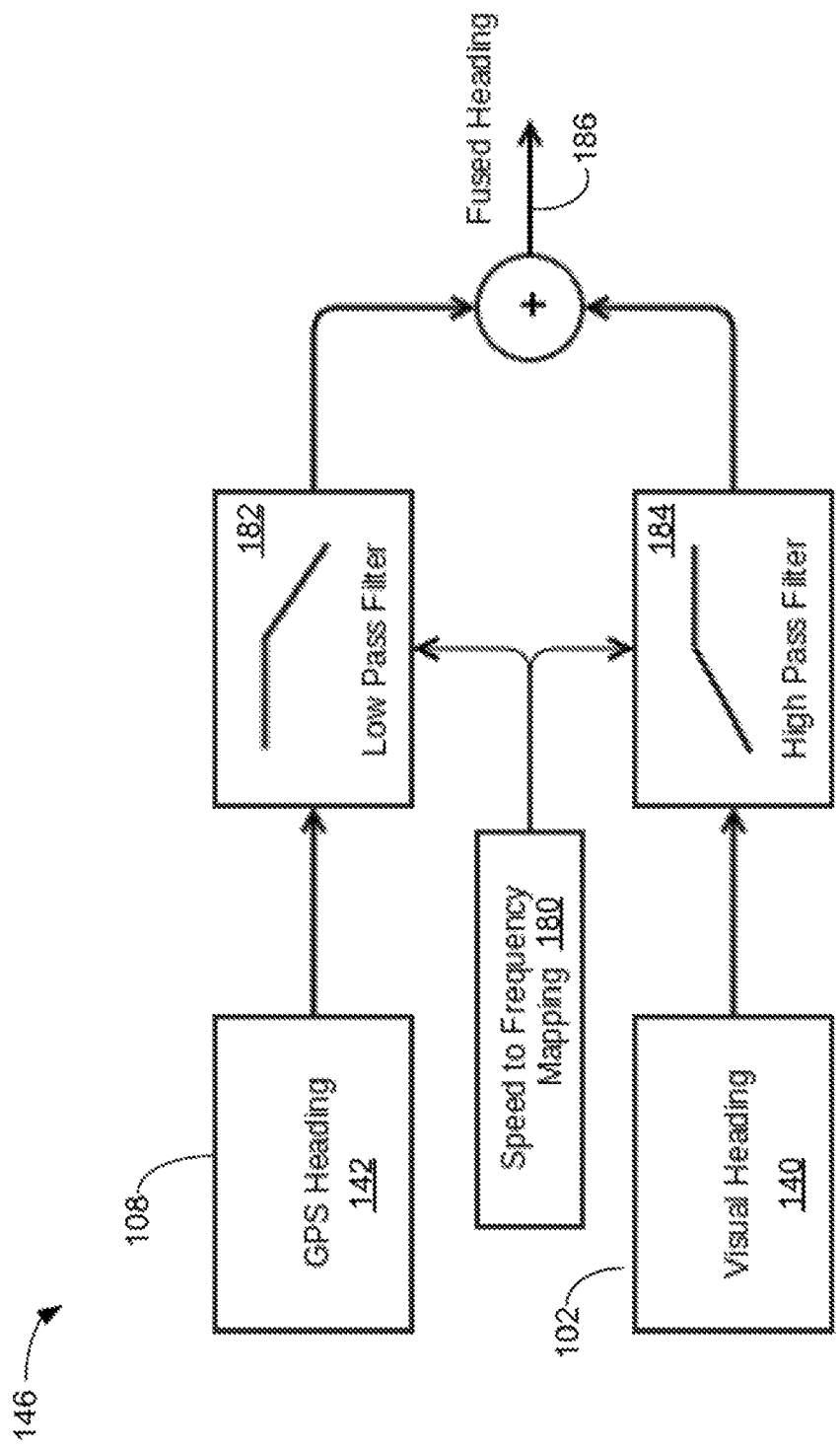
FIG. 7 shows example complementary filters used by the fusion system.

FIG. 7 shows one example scheme for fusing GNSS data 142 and visual heading data 140 using a complementary filter with the filter cross-over frequencies scheduled with speed. A speed to frequency mapping operation 180 may convert the speed of vehicle 50 into a frequency signal. For example, mapping 180 may apply a weighting to a vehicle speed identified in the GPS data to generate a frequency value. The GPS heading data 142 is into a low pass filter 182 and visual heading data 140 is feed into a high pass filter 184.

As mentioned above, GPS velocity heading information 142 becomes less reliable at slower speeds and requires more low-pass filtering. When vehicle 50 is stationary or traveling at very low speeds, GPS data 142 does not provide accurate heading information and is completely filtered by low pass filter 182. At lower speeds, less GPS heading data 142 is provided from low pass filter 182 and more visual heading data 140 is provided from high pass filter 184. At higher speeds, less visual heading data 140 is provided from high pass filter 184 and more GPS heading data 142 is provided from low pass filter 182.

Visual heading data 140 does not give an absolute heading (relative to north) but can provide strong heading change information, even when the vehicle is stationary. The GPS velocity heading data 142 can provide absolute (i.e. relative to north) information while the visual heading data 140 can provide strong heading change information.

As the speed of vehicle 50 drops towards zero, the frequency from mapping operation 180 decreases in complementary filters 182 and 184 until fused heading 186 fully relies on visual heading data 140. As the speed of vehicle 50 increases, the cross-over frequency from frequency mapping operation 180 increases causing fused heading 186 to rely more on the now stronger GPS heading information 142.

Figure 8:
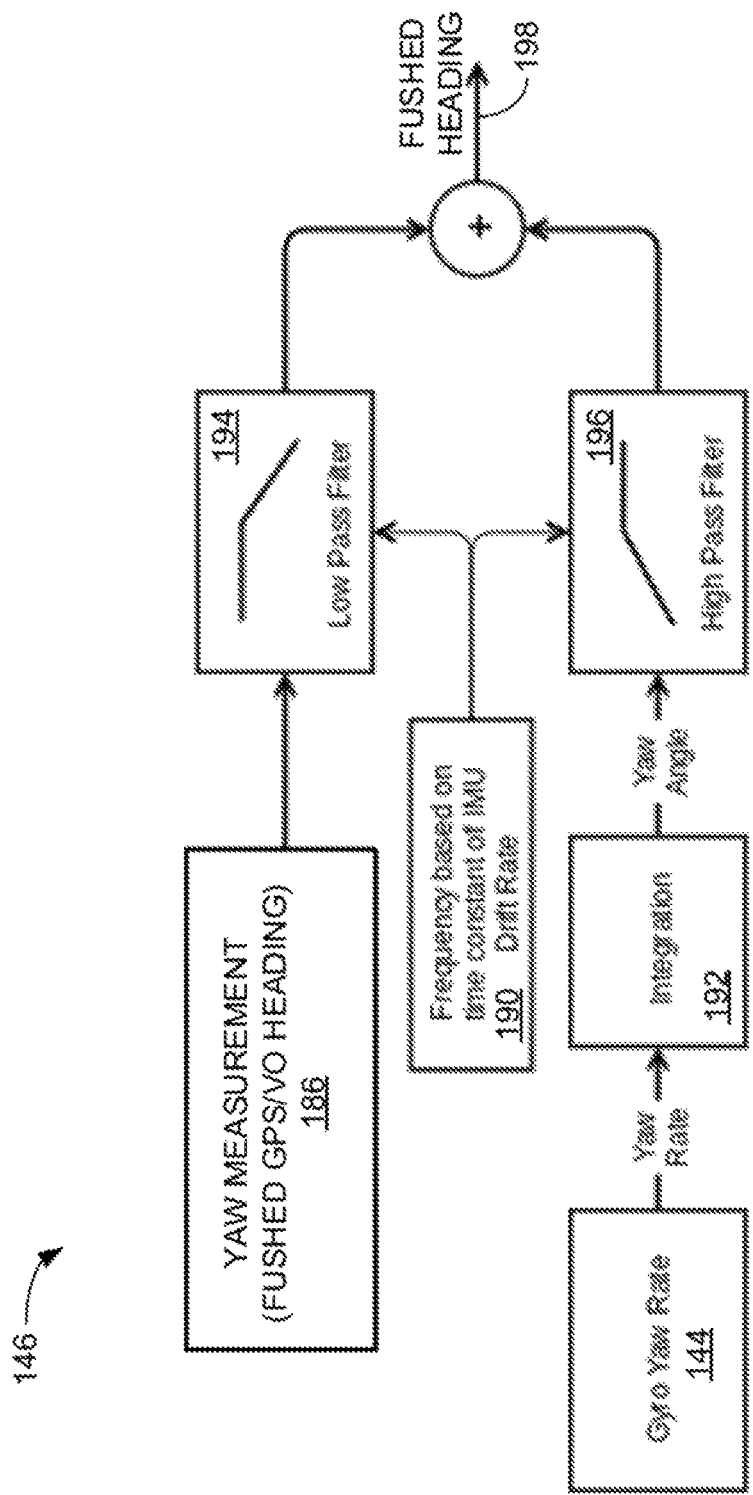
FIG. 8 shows additional complementary filters used by the fusion system.

FIG. 8 shows how fusion operation 146 may generate a fused heading 198. Fused heading 186 derived in FIG. 7 is fed into a low pass filter 194. A gyroscope yaw rate from IMU data 144 is fed into an integrator 192 to produce a yaw angle. The yaw angle is fed into a high pass filter 196.

Inertial sensor data 144 is a useful source of high rate heading rate measurements. However, heading estimates from integrating the inertial rate measurements in integration 192 suffer from drift due to accumulation of small errors in the heading rate measurements. This drift needs to be constrained with absolute heading measurements. When only GPS heading measurements are used as a source of heading corrections, no heading information can be obtained when the vehicle is stationary, in this condition the heading estimates fully rely on the inertial information 144 so the heading estimates will drift.

Complementary filters 194 and 196 handle this data fusion. Fused heading 186 from the complementary filters fusing GPS and visual headings in FIG. 7 provide the absolute heading reference. The absolute heading reference is then used to constrain the drift from integrating the gyro heading rate information 144. The absolute heading reference 186 can be used even when vehicle 50 is stationary, due to the complementary information obtained from the different visual and GNSS heading information. For example, complementary filters 194 and 196 may filter out the low frequency IMU data 144 with less inaccurate information due to low frequency drift and may filter less of the high frequency IMU data 144 which is more accurate.

Figure 9:
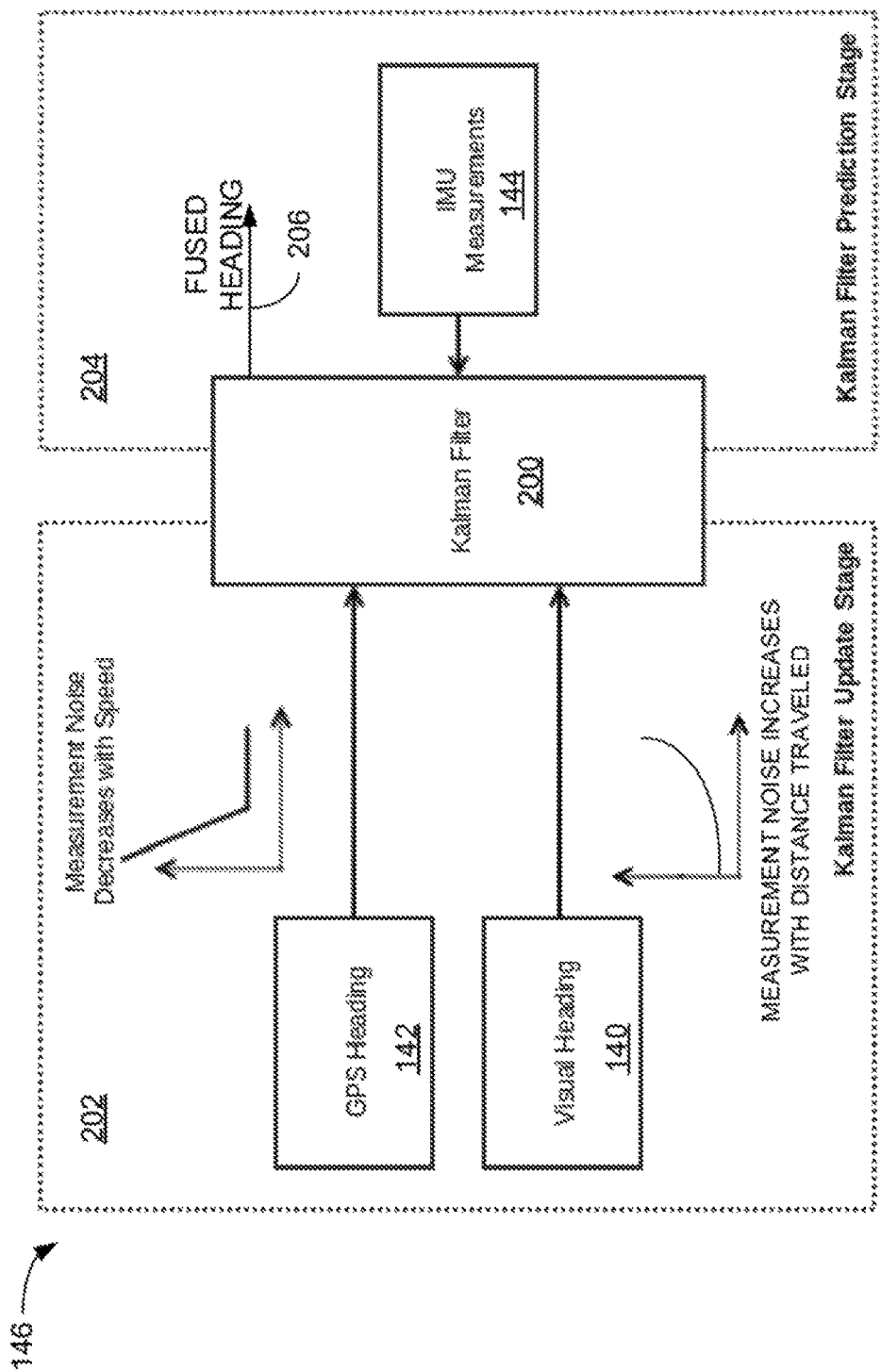
FIG. 9 shows an example Kalman filter used by the fusion system.

FIG. 9 shows how a Kalman filter 200 is used for fusing GPS heading data 142 and visual heading data 140 with IMU measurement data 144. Kalman filter 200 may include a prediction stage that uses the IMU measurements 144 to predict a next forward vehicle heading 206. Kalman filter 200 may include an update stage 202 that uses GPS heading 142 and visual heading 140 to constrain the drift in IMU data 144.

Kalman filter 200 may fuse heading measurements 140, 142, and 144 at the same time with each measurement weighted according to an estimated uncertainty around the measurement. This allows Kalman filter 200 to internally correct a current internal heading estimate using the best available sensor source to produce an overall improved estimate.

As explained above, the estimated uncertainty of GPS heading measurements 142 may be based on the speed of vehicle 50. The estimated uncertainty of visual heading data 140 may be constant relative to speed but may vary over time or distance.

Figure 10:
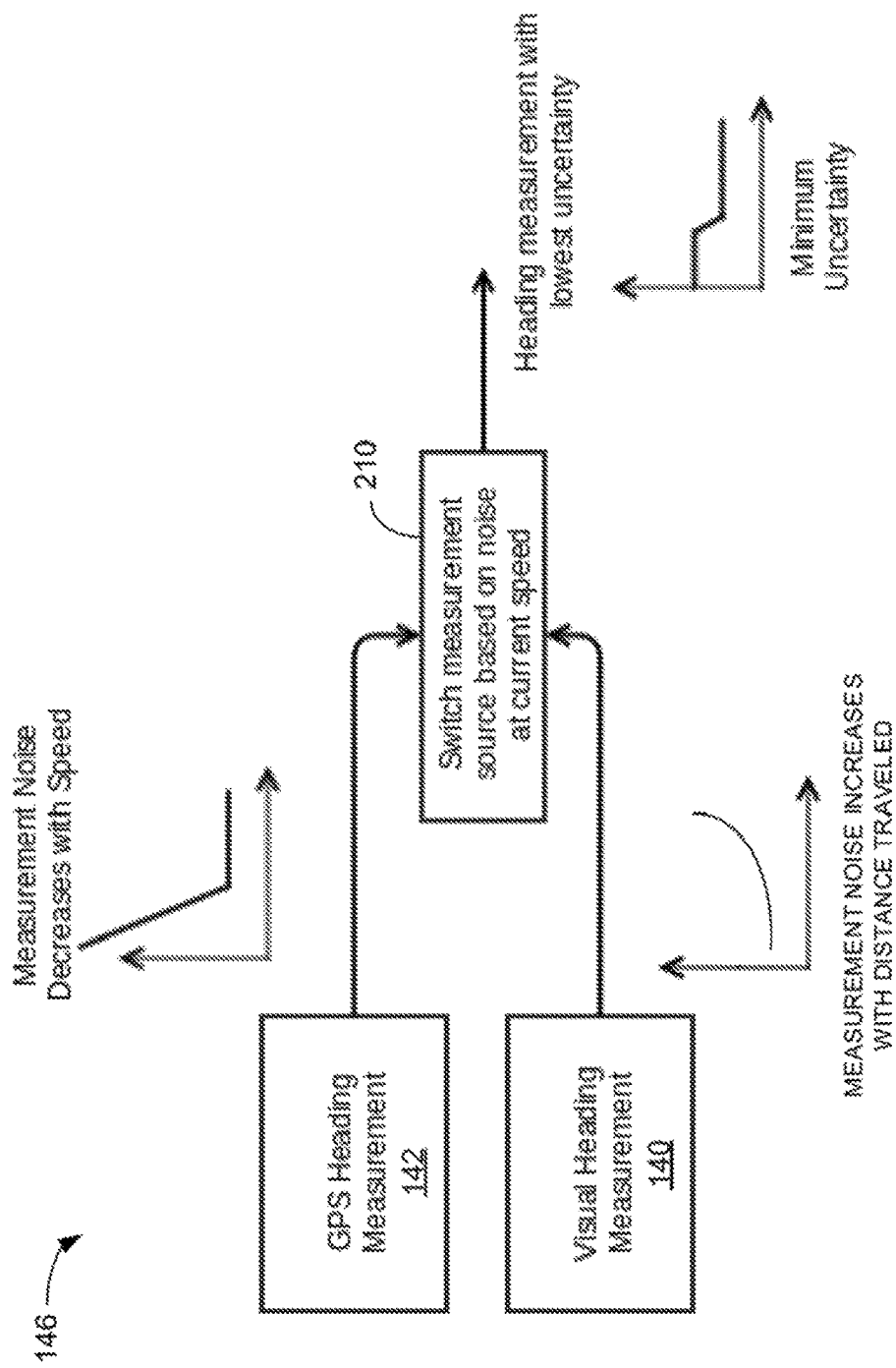
FIG. 10 shows how the fusion system may select different heading measurement data.

FIG. 10 shows another technique for determining heading where GPS and visual measurements are not fused together. GPS heading measurement data 142 and visual heading measurement data are both fed into a switching operation 210 performed by fusion orientation operation 146. Switching operation 210 also receives a current vehicle speed.

Instead of combining heading measurements 140 and 142, switching operation 210 selects one of measurements 142 or 140 with a current lowest uncertainty (highest certainty). For example, at low speeds or stationary conditions, switching operation 210 may select visual heading measurements 140 for determining the vehicle heading. At higher speeds, switching operation 210 may select GPS heading measurements 142 for determining the vehicle heading.

Figure 11:
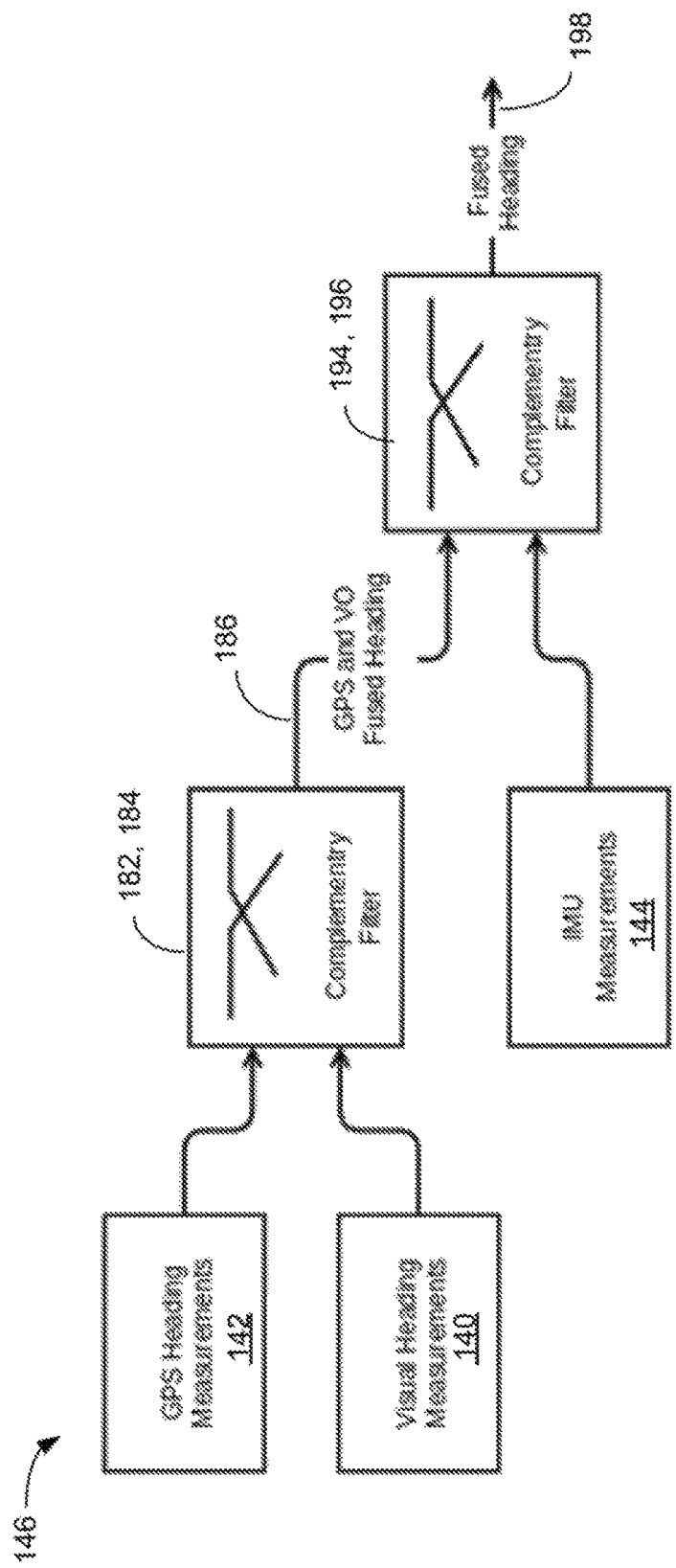
FIG. 11 shows how the fusion system may use cascaded complementary filters.

FIG. 11 shows a cascaded fusion operation. GPS heading measurement data 142 and visual heading measurement data 140 is fed into the complimentary low pass and high pass filters 182 and 184, respectively, as previously shown in FIG. 7. The fused heading data 186 from complimentary filters 182 and 184 and IMU measurement data 144 are fed into complimentary low pass and high pass filters 194 and 196, respectively, shown in FIG. 8. The cascaded complimentary filtering fuses all of the different sensor heading data 140-144 together into a fused heading 198.

Figure 12:
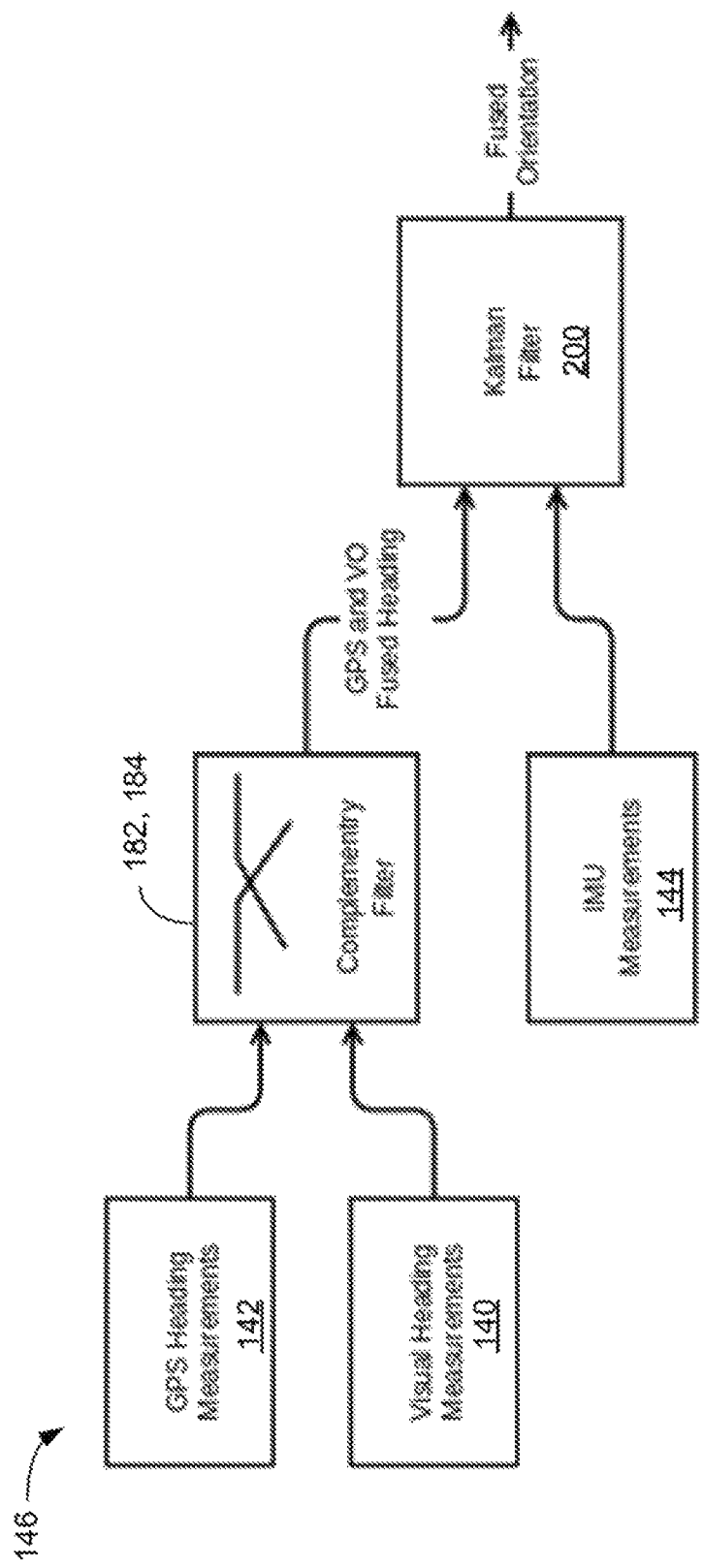
FIG. 12 shows how the fusion system may use complementary filters in combination with a Kalman filter.

FIG. 12 shows an example complementary filter cascaded with a Kalman filter. As shown above in FIG. 11, GPS heading measurement data 142 and visual heading measurement data is fused together by complementary filters 182 and 184. The output of complementary filters 182, 184 is fed into Kalman filter 200 and IMU measurement data 144 is fed into Kalman filter 200. Kalman filter 200 then estimates the vehicle heading and/or other vehicle states based on fused GPS measurement data 142, visual measurement data 140, and IMU measurement data 144.

Initialization

In a normal speed range above 0.5 to 1.0 km/h the GNSS derived course over ground can be used to initialize the system similar to initialization of the IMU. Since the GNSS course over ground is noisy at low speed below approximately 1.0 km/h, control system 100 may not be able to initialize the heading directly from GNSS data. Control system 100 may use GNSS heading data stored for a previous driven path to align the vehicle heading with the course over ground and the true north heading.

Figure 13:
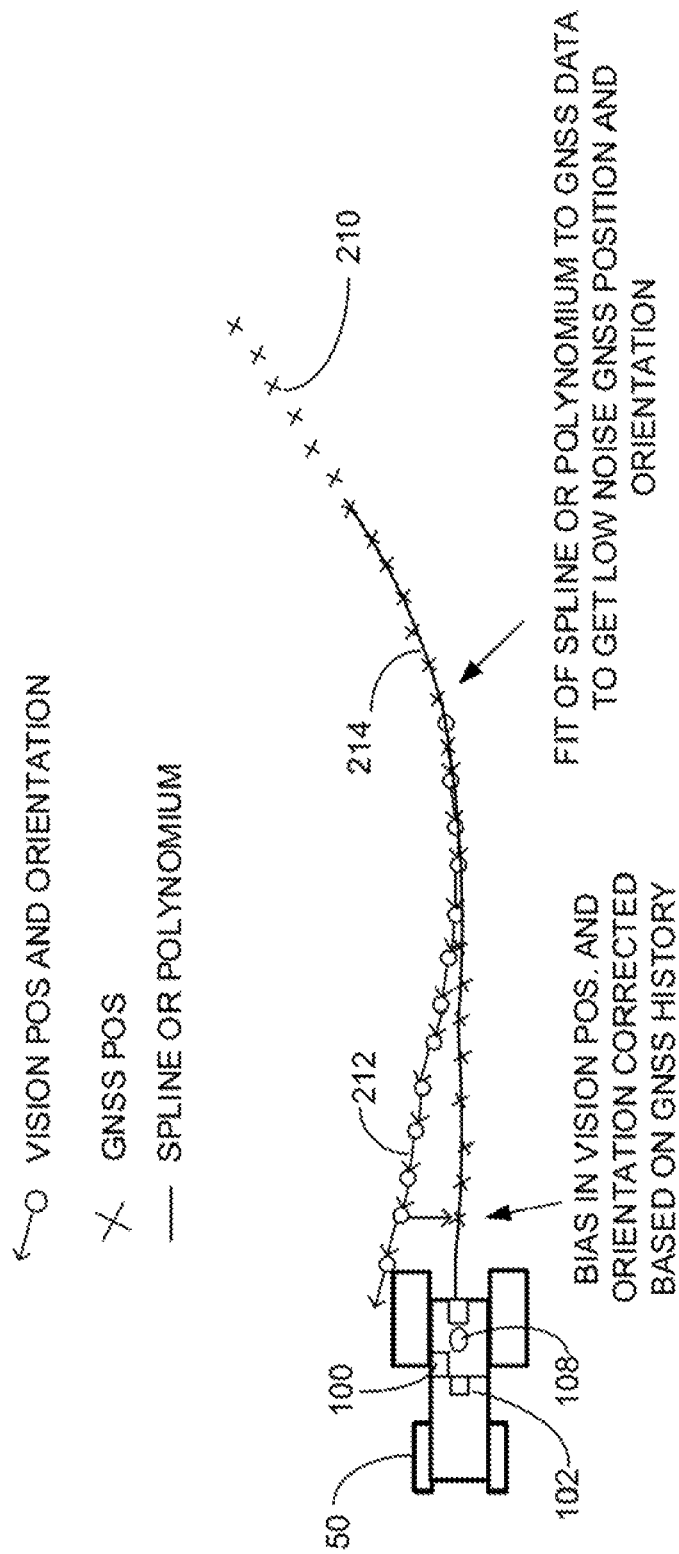
FIG. 13 shows how the fusion system may correct the vision heading data based on a previously traveled vehicle path.

FIG. 13 shows how control system 100 may align a vision path to a GNSS path after a path history length. GNSS 108 may detect a vehicle POS over a path 210 indicated with X's and camera 102 may detect a vehicle pos and orientation over a path 212 indicated by circles with arrows.

Control system 100 may initialize and align the relative vision heading indicated by path 212 to the north GNSS heading indicated by path 210. For example, a polynomial or spline function 214 is fitted to a previous traveled distance, such as the last 10 meters driven by vehicle 50. Polynomial or spline function 214 provides robust information about the course over ground traveled by vehicle 50 even at low speed. Based on the GNSS course over ground 210 and a possible crab angle determined by visual data from camera 102, control system 100 estimates and corrects a bias on vision heading 212. The vision bias may be frequently updated to avoid big jumps in the vision measurements.

In one example, visual heading measurements 212 are produced relative to some initial heading condition while GPS velocity heading measurements 210 are relative to absolute north. In order to use visual measurements 212 when GPS velocity heading measurements 210 are unavailable, control system 100 aligns visual heading 210 and true north. The true north alignment is also updated to account for any accrued visual drift while vehicle 50 is in operation.

Control system 100 may use the visual data to determine the crab angle between GNSS path 210 and an actual course over ground path of vehicle 50. Control system 100 may also assume no crab angle for appropriate vehicle types and when appropriate operating conditions are met. Control system 100 also may measure crab angle using a sensor that measures the velocity of the vehicle in the body frame compared with the velocity of the vehicle in the GPS frame.

Control system 100 derives GPS velocity heading measurements 210 from the motion of the GNSS antenna 108 attached to vehicle 50. Control system 100 derives visual heading measurements 212 based on the orientation vehicle 50 is facing. These two angles (vehicle heading vs velocity heading) do not need to be the same. For example, vehicle 50 might not be traveling in the direction it is facing. A clear example of this is when vehicle 50 is traveling in reverse. While traveling in reverse, vehicle heading and velocity heading measurements are 180 degrees away from each other. A less severe case would be when vehicle 50 is side-slipping due to vehicle under or over-steer in a turn or has a crab angle due to the slope of the terrain.

Control system 100 uses the crab angle to align visual heading measurements 212 with the GPS measurements 210. It is possible to measure this sideslip angle by estimating the velocity vector of the direction of motion relative to the vehicle frame (i.e. motion direction of the camera). In another example, control system may use an assumption about the motion such as a zero side-slip condition. Once determined, control system 100 may use the sideslip angle to align visual heading measurements 212 with GPS velocity heading measurements 210.

Figure 14:
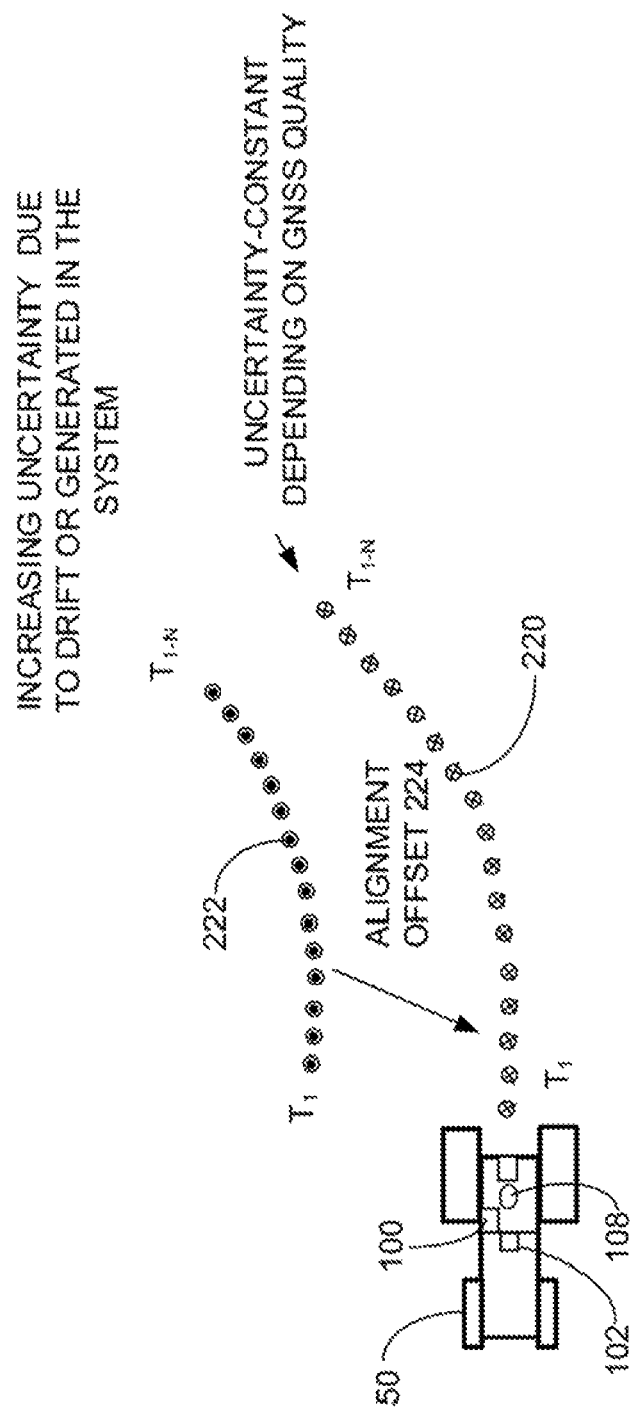
FIG. 14 shows how the fusion system may realign visual heading data with a GNSS heading data.

FIG. 14 shows how control system 100 estimates the GPS course heading based on a time history of GPS positions. Control system 100 may not be able to use GPS velocity heading 220 at low speeds due to the amount of noise on the measurements. Visual heading data 222 must first be aligned with GNSS data 220. In other words, both GNSS heading data 220 and visual heading data 222 are operating in a same north-east frame of reference.

Control system 100 may use a Kalman filter that stores a history of previous headings and positions of vehicle 50. The Kalman filter than combines the heading and position history data with the crab angle derived from the visual data 222 to determine a visual heading alignment offset 224 between GNSS data 220 and visual data 222.

Once the visual to GPS alignment is determined, control system 100 continuously corrects the visual heading measurements 222 based on the alignment offset 224. Control system 100 then uses the corrected/aligned visual heading measurement 222 in-place of GPS measurements 220 when the GPS measurements 220 are unavailable.

Figure 15:
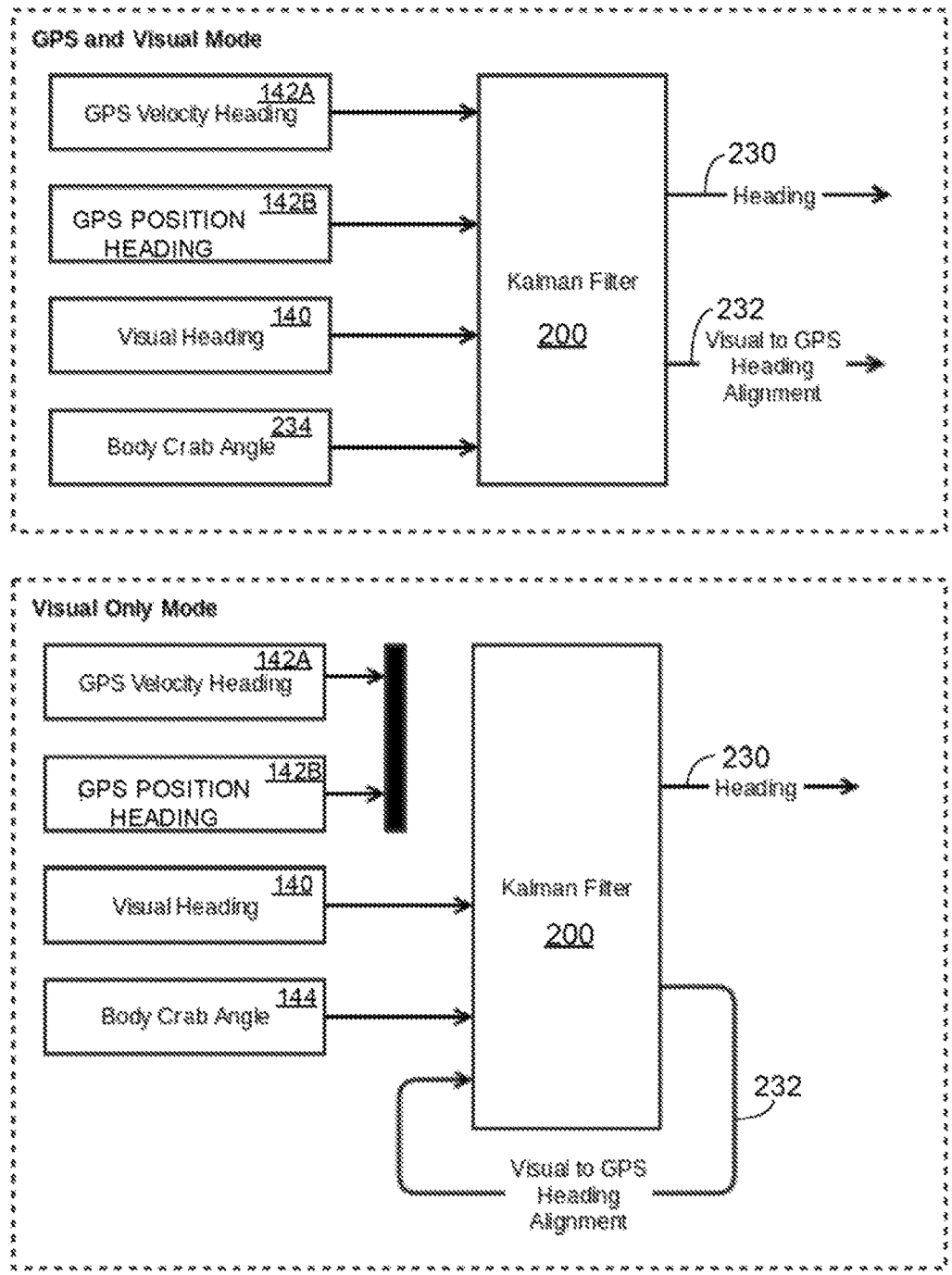
FIG. 15 shows how the fusion system may use a Kalman filter realign visual heading data.

FIG. 15 shows how a Kalman filter is used to estimate vehicle heading from GPS and visual measurements. A GPS velocity heading 142A and a GPS position heading 142B from the GNSS sensor 108 are input into Kalman filter 200. A visual heading 140 from camera 102 and a body crab angle 234 determined from visual data 140 are also input into Kalman filter 200. Kalman filter 200 generates the heading 230 as described above.

Internally Kalman filter 200 can estimate the visual to GPS alignment 232 when both GNSS 108 and camera 102 measurements sources are available. The top block in FIG. 15 shows a GPS and visual mode where both GPS measurement data 142 and visual measurement data 140 is available and used by Kalman filter 200 to determine heading 230. Kalman filter 200 at the same time also uses crab angle 234 to determine alignment 232 that aligns visual heading 140 with GPS heading 142.

The bottom block in FIG. 15 shows a visual only mode where GPS heading data 142 is no longer available when the vehicle is stopped or operating at a very slow speed, such as less than 1 km/h. If GPS measurements 142 become unreliable, Kalman filter 200 can use the last estimated alignment 232 with visual heading measurements 140 to keep heading estimate 230 constrained.

The camera system described above allows the vehicle to continue auto steering with high precision even if GNSS is lost for a shorter period of time. This is especially relevant on headlands where there is often a tree line that can block the view to the satellites. With automatic turning on the headland it is desired to have good positioning also on the headland. The control system may use visual data 140 in combination with SLAM for a field and compare items identified in the map with visually detected features to eliminate the drift problem.

Items causing blockage or causing multipath of GNSS data is often high obstructions like buildings, trees, windmills, power line towers, etc. These obstructions are also very good visual landmarks that are different from other visual features in the field. A field is often driven in the same path year after year. This is also a benefit for the system since the visual features will most often need to be recognized from similar directions.

Some of the operations described above may be implemented in software and other operations may be implemented in hardware. One or more of the operations, processes, or methods described herein may be performed by an apparatus, device, or system similar to those as described herein and with reference to the illustrated figures.

"Computer-readable storage medium" (or alternatively, "machine-readable storage medium") used in control system 100 may include any type of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Examples of systems, apparatus, computer-readable storage media, and methods are provided solely to add context and aid in the understanding of the disclosed implementations. It will thus be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations. Additionally, in other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A control system for fusing different sensor data together to determine an orientation of a vehicle, comprising:
   a hardware processor to:
   receive visual heading data for the vehicle from a camera system;
   receive global navigation satellite system (GNSS) heading data from a GNSS system;
   receive inertial measurement unit (IMU) heading data for the vehicle from an IMU;
   assign weights to the visual heading data, GNSS heading data, and IMU heading data based on operating conditions of the vehicle that vary accuracy associated with the visual heading data, the GNSS heading data, and the IMU heading data;
   use the weighted visual heading data, weighted GNSS heading data, and weighted IMU heading data to determine a heading of the vehicle;
   monitor a speed of the vehicle;
   assign lower weights to the GNSS heading data when the vehicle is stopped or traveling at a speed below a given value;
   assign higher weights to the GNSS heading data when the vehicle is traveling at a speed above the given value;
   stop using one or more of the visual heading data, GNSS heading data, and IMU heading data that drop below associated threshold values to determine the heading of the vehicle; and
   use the remaining ones of the visual heading data, GNSS heading data, and IMU heading data, to steer the vehicle.

2. The system of claim 1, wherein the hardware processor is further configured to:
   receive visual position data for the vehicle from the camera system;
   receive GNSS position data from the GNSS system;
   assign weights to the visual position data and the GNSS position data based on the operating conditions of the vehicle; and
   use the weighted visual position data and the weighted GNSS position data to determine a position of the vehicle.

3. The system of claim 1, wherein the hardware processor is further configured to:
   assign higher weights to the visual heading data when the vehicle is stopped or traveling at a speed below a given value; and
   assign lower weights to the visual heading data when the vehicle is traveling at a speed above the given value.

4. The system of claim 3, wherein the hardware processor is further configured to:
   assign a zero weight to the GNSS heading data and only use the visual heading data to determine the heading of the vehicle when the vehicle is stopped.

5. The system of claim 1, wherein the hardware processor is further configured to:
   continuously generate visual drift corrections between the visual heading data and the GNSS heading data when the GNSS heading data is available;
   monitor a distance traveled by the vehicle;
   assign lower weights to the visual heading data as the vehicle travels longer distances between the visual drift corrections; and
   use the visual heading data without any assigned weights to determine the heading of the vehicle when the GNSS heading data is not available.

6. The system of claim 1, wherein the hardware processor is further configured to:
   identify a drift rate for the IMU; and
   assign a weight to the IMU heading data based the drift rate.

7. The system of claim 1, wherein the hardware processor is further configured to:
   estimate a bias of the IMU based on the visual heading data; and
   calibrate the IMU based on the estimated bias.

8. The system of claim 1, wherein the hardware processor is further configured to align the heading of the vehicle relative to a true north based on a previous traveled path of the vehicle.

9. The system of claim 1, wherein the hardware processor is further configured to initialize and update the heading of the vehicle based on a map with stored visual features that the camera system recognizes and uses for generating the visual heading data.

10. The system of claim 1, wherein the hardware processor is further configured to estimate a drift in the visual heading data by continuously analyzing a previous portion of a path traveled by the vehicle.

11. A computer system for calculating a heading of a vehicle, the computer system comprising:
    a processor; and
    memory coupled to the processor and storing a set of instructions that, when executed by the processor, cause the computer system to:
    receive visual heading data for the vehicle from a camera system;
    receive global navigation satellite system (GNSS) heading data from a GNSS system;
    receive inertial measurement unit (IMU) heading data from an IMU;

monitor operating conditions of the vehicle that reduce reliability of one or more of the visual heading data, GNSS heading data, and IMU heading data;
use different combinations and weightings of the visual heading data, GNSS heading data, and IMU heading data to determine a heading of the vehicle and compensate for the operating conditions that reduce the reliability of the visual heading data, GNSS heading data, and IMU heading data;
generate a frequency signal that varies based on a speed of the vehicle;
input the frequency signal into a complimentary low pass filter and high pass filter;
input the GNSS heading data into the low pass filter;
input the visual heading data into the high pass filter;
use a fused heading output from the complimentary low pass filter and high pass filter to determine the vehicle heading;
stop using at least one of the visual heading data, GNSS heading data, and IMU heading data to determine the heading of the vehicle when the associated weighting drops below a threshold value; and
use remaining ones of the visual heading data, GNSS heading data, and IMU heading data, to steer the vehicle.

12. The computer system of claim 11, wherein the set of instructions further cause the computer system to:
generate a second frequency signal based on drift rate time constant associated with the IMU;
input the second frequency signal into a second complimentary low pass filter and high pass filter;
input the fused heading into the second low pass filter;
input an integrated yaw rate from the IMU heading data into the second high pass filter; and
use an output of the second complimentary low pass filter and high pass filter to determine the vehicle heading.

13. The computer system of claim 11, wherein the set of instructions further cause the computer system to:
input the fused heading into a Kalman filter;
input the IMU heading data into the Kalman filter; and
use the Kalman filter to determine the vehicle heading based on the fused heading and the IMU heading data.

14. The computer system of claim 11, wherein the set of instructions further cause the computer system to:
input the GNSS heading data, the visual heading data, and the IMU heading data into a Kalman filter; and
use the Kalman filter to determine the vehicle heading based on the GNSS heading data, the visual heading data, and the IMU heading data.

15. The computer system of claim 14, wherein the set of instructions further cause the computer system to use the Kalman filter to align the visual heading data with the GNSS heading data.

16. The computer system of claim 15, wherein the set of instructions further cause the computer system to use the Kalman filter to determine the heading of the vehicle based only on the aligned visual heading data when the GNSS heading data is unavailable or inaccurate.

17. A computer system for calculating a heading of a vehicle, the computer system comprising a processing device operable to:
receive visual heading data for the vehicle from a camera system;
receive global navigation satellite system (GNSS) heading data from a GNSS system;
generate a first frequency signal that varies based on a speed of the vehicle;
input the frequency signal into a first low pass filter and high pass filter;
input the GNSS heading data into the first low pass filter;
input the visual heading data into the first high pass filter;
generate a fused heading from the first low pass and high pass filter;
receive inertial measurement unit (IMU) heading data from an IMU;
generate a second frequency signal based on a drift rate time constant associated with the IMU;
input the second frequency signal into a second low pass and high pass filter;
input the fused heading into the second low pass filter;
input the IMU heading data into the second high pass filter;
use an output of the second low pass and high pass filter to determine the heading of the vehicle; and
use the output of the second low pass and high pass filter to steer the vehicle.

* * * * *